United States Patent [19]

Bronicki et al.

[11] Patent Number: 5,531,073
[45] Date of Patent: Jul. 2, 1996

[54] RANKINE CYCLE POWER PLANT UTILIZING ORGANIC WORKING FLUID

[75] Inventors: Lucien Y. Bronicki, Yavne; Asher Elovic, Macabeem, both of Israel

[73] Assignee: Ormat Turbines (1965) Ltd, Yavne, Israel

[21] Appl. No.: 460,728

[22] Filed: Jun. 2, 1995

Related U.S. Application Data

[63] Continuation of Ser. No. 295,036, Aug. 25, 1994, abandoned, which is a continuation of Ser. No. 918,001, Jul. 24, 1992, abandoned, which is a continuation-in-part of Ser. No. 730,526, Jul. 15, 1991, abandoned, which is a continuation-in-part of Ser. No. 658,303, Feb. 20, 1991, abandoned, which is a continuation of Ser. No. 444,565, Dec. 1, 1989, abandoned.

[51] Int. Cl.$^6$ .................. F03G 7/00; F01K 7/34
[52] U.S. Cl. .................. 60/641.2; 60/653; 60/676
[58] Field of Search .................. 60/641.2, 641.3, 60/641.5, 653, 676

[56] References Cited

U.S. PATENT DOCUMENTS

| | | | |
|---|---|---|---|
| 2,384,587 | 9/1945 | Badenhausen | 60/676 |
| 3,016,712 | 1/1962 | Taylor | 60/676 |
| 3,234,734 | 2/1966 | Buss et al. | |
| 3,257,806 | 6/1966 | Stahl | 60/655 |
| 3,457,725 | 7/1969 | Schwarzenbach | 60/676 |
| 3,621,653 | 11/1971 | Da Cault et al. | 60/655 |
| 3,851,474 | 12/1974 | Heller et al. | 60/655 X |
| 3,937,024 | 2/1976 | Durrant et al. | 60/676 |
| 4,041,709 | 8/1977 | Rajakovics | |
| 4,100,745 | 7/1978 | Gyarmathy et al. | 60/655 X |
| 4,293,384 | 10/1981 | Weber | 60/655 X |
| 4,542,625 | 9/1985 | Bronicki | 60/641.2 |
| 4,578,953 | 4/1986 | Krieger et al. | |
| 4,700,543 | 10/1987 | Krieger et al. | |

FOREIGN PATENT DOCUMENTS

| | | | |
|---|---|---|---|
| 1626151 | 1/1971 | Germany. | |
| 0150532 | 11/1979 | Japan | 60/641.2 |
| 0148205 | 9/1983 | Japan | 60/641.2 |

*Primary Examiner*—Edward K. Look
*Assistant Examiner*—Hoang Nguyen
*Attorney, Agent, or Firm*—Donald M. Sandler

[57] ABSTRACT

A Rankine cycle power plant includes a pair of multistage turbine modules each of which has an input for receiving vaporized working fluid and an output shaft, and each of which is responsive to vaporized working fluid applied to its input for expanding the working fluid and producing work at the output shaft and heat depleted working fluid that is superheated. An electrical generator is located between the modules and directly coupled to their output shafts. Superheated, heat depleted working fluid from one of the modules is supplied to the input of the other of the modules.

80 Claims, 2 Drawing Sheets

RANKINE CYCLE POWER PLANT UTILIZING ORGANIC WORKING FLUID

RELATED APPLICATIONS

This application is a continuation of application Ser. No. 08/295,036, filed Aug. 25, 1994, now abandoned, which is a continuation of Ser. No. 07/918,001, filed Jul. 24, 1992, now abandoned, which is a continuation-in-part of Ser. No. 07/730,526, filed Jul. 15, 1991, now abandoned, which is a continuation-in-part of Ser. No. 07/658,303, filed Feb. 20, 1991, now abandoned, which is a continuation of Ser. No. 07/444,565, filed Dec. 1, 1989, now abandoned.

TECHNICAL FIELD

This invention relates to a process for converting heat to work using an expansion engine such as in a Rankine cycle power plant that utilizes an organic working fluid, and more particularly a power plant to the type disclosed that operates on low grade heat sources.

BACKGROUND

U.S. Pat. No. 3,234,734 discloses a Rankine cycle power plant that operates on various organic fluids (e.g., biphenyl). The thermodynamic properties of many organic fluids are such that the saturated vapor line on the temperature-entropy (T-S) diagram for the fluids has a positive slope. As a result, working fluid that exits the vaporizer of a power plant in a saturated vapor state and is applied to the inlet of a turbine, expands and exits the turbine in a superheated state. Upon its expansion to the pressure of the condenser, the working fluid will contain a substantial amount of superheat that the condenser must remove before the working fluid can be condensed and returned to the vaporizer. The superheat rejected by the condenser into the ambient environment is wasted because the rejected heat, which was added to the working fluid in the vaporizer and preheater of the power plant, can not be converted to work.

The patent seeks to improve the thermodynamic efficiency of a power plant of the type described by decreasing the amount of superheat in the vaporized working fluid supplied to the condenser. It achieves this end by decreasing the superheat between the stages of turbine. Specifically, the patent discloses a multi-stage turbine in which vaporized working fluid exhausted from a preceding stage is withdrawn from the turbine, and mixed with liquid working fluid derived from a preheater interposed between the condenser of the power plant and the vaporizer. As a result, the superheat in the working fluid applied to the succeeding stage is reduced permitting this heat to be utilized for conversion to work instead of being rejected in the condenser. The result is an increase in the power produced by the power plant, and in its thermodynamic efficiency.

While the design approach in U.S. Pat. No. 3,234,734 is one that significantly improves the performance of a Rankine cycle power plant that operates on an organic fluid using a multistage turbine configuration, it does not address the economic problem of constructing a practical system to generate electricity in the range below, for example, about 10 MW with a low temperature heat source such as geothermal hot water with a temperature lower than about 400° F. Thus, the patent shows a single multi-stage turbine, or a binary cycle using two turbines, which must be connected to a generator by way of a gear reducer because of the large differences in rotational speeds of the turbine and the generator. This configuration complicates construction, maintenance, and lubrication by reason of the multiple bearings and the gear reducer required.

It is therefore an object of the present invention to provide a new and improved expansion engine such as in a Rankine cycle power plant that utilizes an organic working fluid and which usually operates from a relatively low grade heat source of medium or low temperature fluid, which is less complicated and more reliable.

DISCLOSURE OF INVENTION

Apparatus in accordance with the present invention for producing power includes a pair of expansion engine modules, preferably in the form of multi-stage turbine modules each of which has an input for receiving vaporized working fluid and an output shaft, and each of which is responsive to vaporized working fluid applied to its input for expanding the working fluid and producing work at the output shaft, and heat depleted working fluid that is superheated. An electrical generator is located between the modules and directly coupled to their output shafts. Means are provided for supplying superheated heat depleted working fluid from one of the modules to the input of the other of the modules.

By dividing the turbine into separate modules and placing the modules on either side of a generator, the physical construction of the power plant is simplified because only two bearings are necessary to support the turbines and the generator, and because no gear reduction system is required for interposition between the turbine modules and the generator.

The apparatus of the present invention further includes a vaporizer for supplying vaporized working fluid to one of the modules, a preheater, preferably separate from the vaporizer, for supplying heated working fluid to the vaporizer, and preferably, a mixer interposed between modules and through which superheated, heat depleted working fluid from the one module is transferred to the input of the other module. Preferably, means are provided for supplying liquid working fluid to the mixer for desuperheating working fluid supplied to the input of the other modules. Preferably, the liquid working fluid supplied to the mixer is heated working fluid produced by the preheater. Alternatively, the liquid working fluid may be derived directly from the condenser output without preheating.

BRIEF DESCRIPTION OF THE DRAWINGS

Embodiments of the present invention is described by way of example with reference to the accompanying drawings wherein.

DETAILED DESCRIPTION

Figure 1:
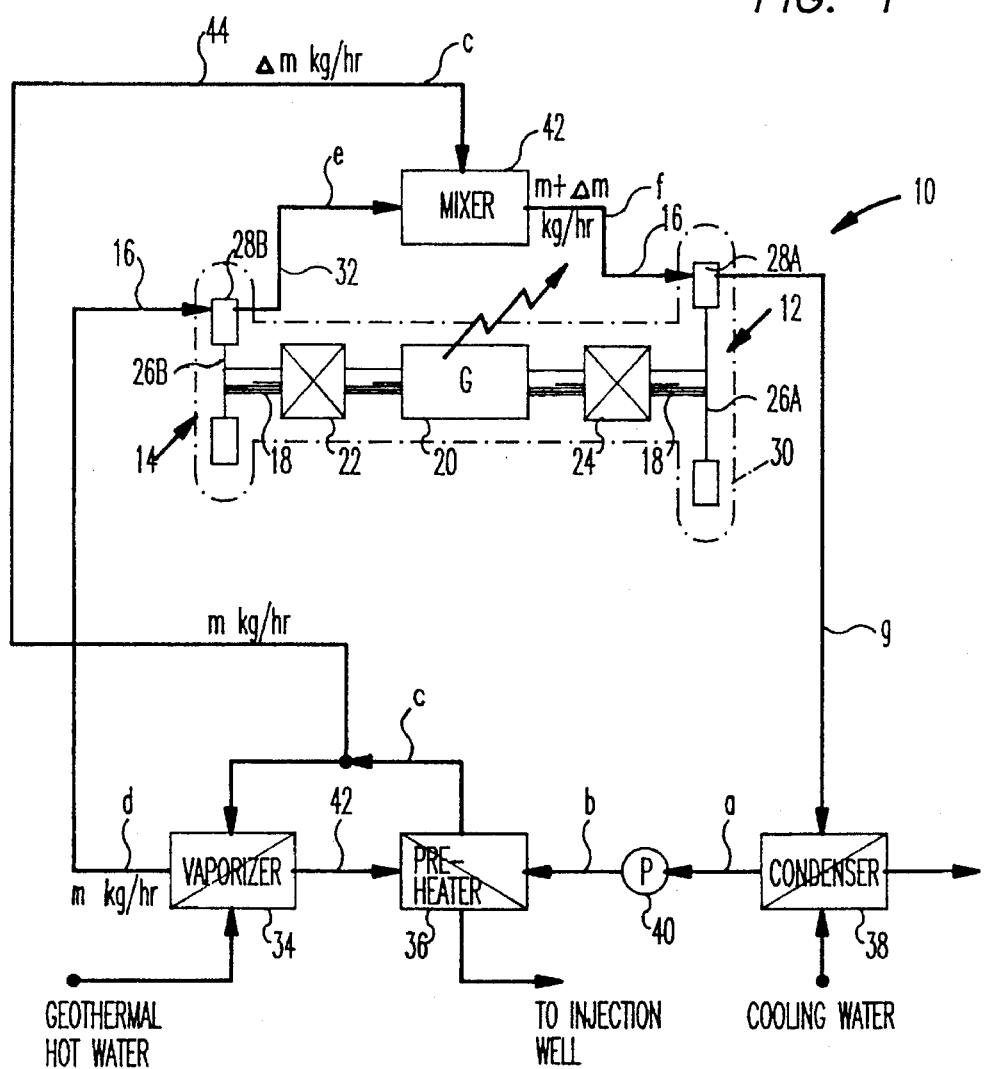
FIG. 1 is a block diagram of one embodiment of a power plant according to the present invention.

Referring now to the drawings, reference numeral 10 designates apparatus according to the present invention comprising a pair of multi-stage turbine modules 12, 14 each of which has input 16 for receiving vaporized working fluid, and output shaft 18. These turbine modules are responsive to vaporized working fluid supplied to input 16 for expanding the working fluid and producing work at output shafts 18, and heat depleted working fluid that is superheated as described below. Apparatus 10 further includes electrical generator 20 located between modules 12 and 14 and directly coupled to their input shafts. Specifically, shafts 18 are the free ends of a unitary shaft that extends from opposite ends of generator 20 and is mounted in two separate bearings 22, 24 thereby supporting the generator and the two turbine modules. Turbine module 12 includes disc 26A rigidly connected to output shaft 18, and a plurality of turbine blades 28A on the periphery of the disc. Turbine module 14 includes disc 26B rigidly connected to shaft 18, and a plurality of turbine blades 28B on the periphery of the disc. Enclosing each of the modules, and preferably enclosing also generator 20 is casing 30.

Depending on the capacity of the power plant, each module may include more than one stage, and preferably two stages. Inputs 16 to the turbine modules are schematically shown in the drawing but, in accordance with standard practice associated with organic fluid turbines, each input is in the form of an annular nozzle ring to which vaporized working fluid is applied. Apparatus 10 further comprises means in the form of conduit 32, for supplying superheated, heat depleted working fluid from module 14 to module 12.

By reason of the serial application of working fluid to the turbine modules, the pressure ratio across each of the modules is much smaller than the pressure ratio would be were the modules a part of a single multistage unitary turbine. That is to say, if the inlet pressure of the vaporized working fluid to module 14 is 200 psia, the pressure at the inlet of module 12 may be of the order of magnitude of about 60 psia and the condenser pressure may be of the order of 20 psia. If a single, multistage turbine were used, a pressure drop of about 10:1 across the turbine would be produced. The rotational speed would be several times the ideal rotational speed for a low cost generator, which is about 1800 RPM.

According to the present invention, using two separate modules will result in a pressure drop of about 3:1 across each module. As a result, the turbine modules will operate efficiently at about 1800 rpm which is a convenient, and standard rotational speed for generator 20. This eliminates the need for any gear reduction between the turbine modules and the generator. This configuration also permits the overhang shaft of generator 20 to be mounted in bearings 22, 24 with sufficient additional overhang to provide mounting for discs 26A and 26B of the modules. Two or more discs can be used in each module if circumstances warrant.

While the drawing schematically illustrates a single stage in each of modules 12 and 14, the preferred arrangement is to have two stages such that with pentane as the working fluid, generator 20 will produce about 3.5 MW under the inlet conditions specified above.

Power plant 10 further includes vaporizer 34 for supplying vaporized working fluid to input 16 of turbine module 14, preheater 36 for supplying heated working fluid to vaporizer 34, and condenser 38 for condensing heat depleted working fluid exhausted from turbine module 12 and producing condensate that is returned to preheater 36 using pump 40. Preferably, apparatus 10 further includes mixer 42 interposed between turbine modules 12 and 14 through which superheated, heat depleted working fluid from module 14 passes via conduit 32 for transfer to input 16 of turbine module 12.

Conduit 44 constitutes means for supplying liquid working fluid to mixer 42 for desuperheating the working fluid exhausted from module 14 before this working fluid is applied to input 16 of module 12. Specifically, mixer 42 is a chamber into which liquid working fluid supplied by conduit 44 is sprayed into the superheated vaporized working fluid exhausted from module 14. Sufficient volume for the mixer is provided so that the desuperheating of the working fluid occurs before the working fluid enters inlet 16 of module 12. The design is such that the working fluid is in a substantially saturated vapor state at the inlet to module 12.

The heat required for the power plant to operate is supplied by a low temperature heat source such as geothermal hot water which is supplied to vaporizer 34. After vaporizing the working fluid in the vaporizer, the heat depleted geothermal water is then delivered to preheater 36 via conduit 42 where additional heat in the geothermal hot water is given up to liquid working fluid in the preheater. The further heat depleted geothermal water is then typically transported to an injection well for disposal.

Figure 2:
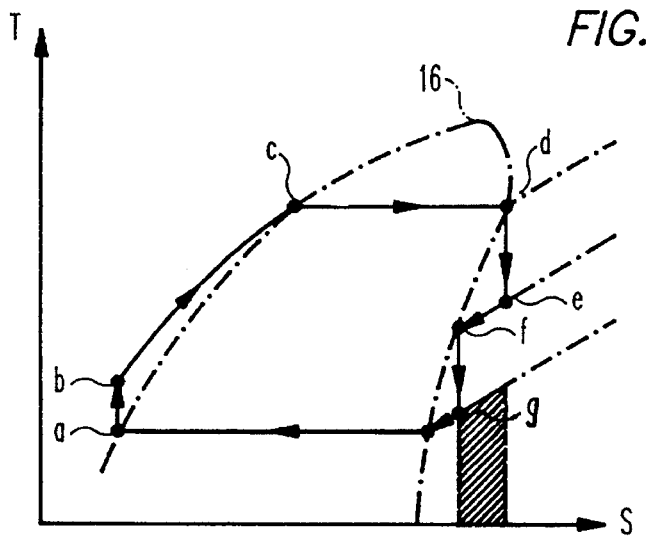
FIG. 2 is a temperature-entropy (T-S) diagram for a typical organic fluid.

Condensate produced by condenser 38, shown as being cooled by water, but which alternatively may be air cooled, is in state "a" as indicated in the T-S diagram of FIG. 2. Thus, the condensate lies substantially on the saturated liquid line of the T-S diagram, and pump 40 serves to raise the pressure of the liquid working fluid which is then moved to state "b" in the supercooled region of the T-S diagram.

In preheater 36, the state of the working fluid changes from "b" to "c" as the temperature of the working fluid is raised to the temperature of the vaporizer, state "c" being on the saturated liquid line of the T-S diagram. Heat absorbed by the saturated liquid in vaporizer 34 causes the working fluid to boil at constant temperature and pressure as indicated in the T-S diagram of FIG. 2. At the exit of the vaporizer, the working fluid is in a substantially saturated vapor state indicated at "d" and the vaporized working fluid is supplied to inlet 16 of turbine module 14. In this module, the working fluid expands at essentially constant entropy into the superheated region ending at state "e" at a pressure intermediate the vaporizer and condenser pressure. The positive slope of the saturated vapor line in the T-S diagram for organic fluids results in the superheated condition of the vapor exhausted from module 14.

Superheated, heat depleted working fluid exhausted from module 14 is applied to mixer 42 where liquid at state "c" from preheater 36 is sprayed into the vaporized working fluid. This liquid is vaporized by a heat exchange process with the superheated working fluid such that the working fluid substantially is in state "f" at the inlet to module 12. This is to say, the vaporized working fluid moves along a constant pressure line substantially to the saturated vapor state by reason of the operation of mixer 42. Thus, the mass of fluid applied to inlet 16 of module 12 is greater than the mass of fluid applied to inlet 16 of module 14 by reason of the liquid extracted from preheater 36 and applied via conduit 44 to mixer 42.

The now substantially saturated vapor applied to module 12 expands in the module producing work that drives shaft 18, and producing superheated, heat depleted working fluid at state "g". This now superheated and heat depleted working fluid is applied to condenser 38 where condensation takes place returning the working fluid from state "g" to state "a", and the cycle repeats.

Some of the advantages derived from the apparatus shown in FIG. 1 can be appreciated from inspection of FIG. 2 where the cross-hatched area represents the amount of heat involved in desuperheating the working fluid passing from module 14 to module 12. Normally, without mixer 42, this heat would have been rejected into the ambient environment in condenser 38. In the present invention, however, this heat is actually utilized within the second module for the purpose of generating power. The additional work is represented by the incremental amount of liquid which is in injected into mixer 42.

Further advantages of the apparatus shown in FIG. 1 lie in the increased turbine efficiency that is achieved by reason of reducing the pressure ratio across each turbine module, the resultant larger blade size, the use of improved blade angles, and the increased mass flow achieved by arranging the turbine modules for serial rather than parallel flow. Combined with the slower speed of the turbine modules and the elimination of a gear reduction between the modules and the generator, as well as the use of a common unitary shaft for mounting the turbine discs and the generator permitting the mechanical portion of the power plant to be supported with two bearings, a coupling is eliminated, better alignment is achieved, and less vibration stresses are present, consequently facilitating the mechanical design. Furthermore, stresses in the turbine discs are also reduced because of the lower rotational speed of the turbine. Thus, a particularly efficient and simple design is achieved with a consequent reduction in maintenance.

In accordance with the present invention, the temperature of the heat depleted geothermal water can be reduced to a new optimum point compared to a system where liquid working fluid is not added for desuperheating working fluid supplied to the input of the other module. This permits greater amounts of heat to be input into the power plant increasing the power output at the same Carnot efficiency.

As a result of the preferred use of an increased number of expansion stages, the Mach numbers in the turbine blading used in accordance with the present invention are advantageously reduced, resulting in higher turbine efficiency. Additionally, by arranging the turbine modules in series in accordance with the present invention, the mass flow through the turbine stages is doubled in comparison to the flow that would occur were the turbines operated in parallel, resulting in increased blade heights thereby achieving higher efficiency levels. Furthermore, the higher mass flow through the turbine at each stage combined with a lower pressure ratio per stage, reduces parasitic losses resulting from turbine disc seal leakage (i.e., the amount of working fluid leaking from the turbine discs and flowing between the circumference of the turbine wheels and the turbine housing), as well as nozzle diaphragm losses. Also, by adding liquid working fluid to the mixer for desuperheating the working fluid supplied to the downstream modules, the blade height of the turbines can be increased further in the low pressure module further increasing turbine efficiency.

Figure 3:
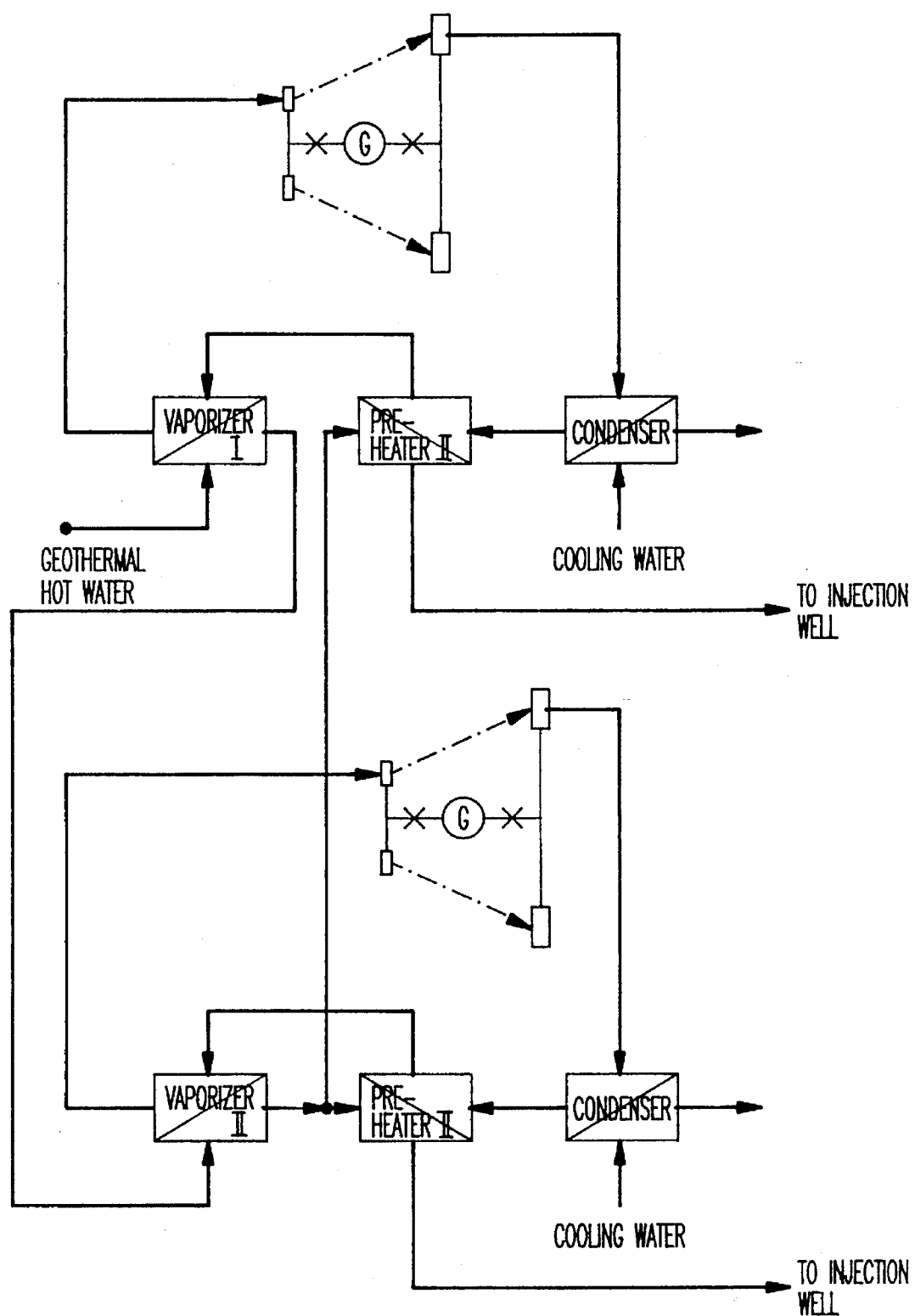
FIG. 3 is a block diagram of a second embodiment of the present invention.

In addition, the present invention permits the use of more turbine stages than were used previously in accordance with the teachings of U.S. Pat. Nos. 4,578,953 and 4,700,543, the disclosures of which are hereby incorporated by reference. Preferably, four turbine stages (i.e., two turbine discs for each module) are utilized in the present invention whereas two modules in parallel, each using two turbine stages were usually used in power plants built and operating in accordance with the teachings of the two above mentioned U.S. patents. FIG. 3 shows a schematic representation of this embodiments of the invention. By using more stages in accordance with the present invention, the off-design performance of the system is greatly enhanced.

Off design performance is mainly caused by variations in temperature of the ambient air and/or temperature of the condenser cooling medium which modify the condenser pressure consequently changing the back pressure on the turbine. By dividing the turbine into separate modules, the Mach number in the fourth, or last turbine stage, can be made high enough (e.g., around M=1.2) to substantially isolate the upstream discs from changes in the back pressure. Consequently, substantially only the last stage is affected by changes in pressure drop across the entire turbine. For example, if the turbine is designed for a 200 psi pressure drop across the entire turbine, and the actual pressure drop increases to say 220 psi due to off-conditions, the last stage will experience the additional 20 psi, while the other upstream stages will remain at substantially optimum design conditions.

One way to increase the Mach numbers in the last stage is to extract more work from the working fluid in the module where the pressure is lower, i.e., module 12. This requires an increase in the pressure drop across module 12. Furthermore, by designing the turbine so that module 12 produces more work, higher overall turbine efficiencies can be achieved because this module is inherently more efficient than the higher pressure module 14 because less turbine disc leakage occurs in module 12, and the increased blade height in module 12 effects a lower mass flow density. Furthermore, by using a pair of modules, greater flexibility in design is permitted in order to increase the efficiency of the turbine. For example, the reaction level in module 12 can be made greater than in module 14, the blade speeds can be different, vapor nozzle velocities for the two modules can be different, etc. Thus, while the rotational speed of the turbine can be maintained at say 1800 RPM, the blade speeds for each of modules 12 and 14 may be made significantly different due to changes in the sizes of the discs while high efficiency levels are maintained.

In addition, by locating electrical generator 20 between modules 12 and 14, the torques on shafts 18 are axially balanced thus avoiding the necessity for one one of the shafts to have to transmit torque produced by both turbine modules.

While mixer 42 is shown as being supplied with liquid working fluid from preheater 36, liquid working fluid in the form of condensate produced by condenser 38 can be supplied to the mixer from the exit of pump 40. In such case, a smaller volume of liquid would be required for interstage desuperheating inasmuch as the condensate would first have to absorb sensible heat as it is raised to saturated liquid temperature at the interstage pressure before absorbing the latent heat of vaporization from the superheated working fluid.

Although mixer 42 is shown as being supplied with liquid working fluid from preheater 36, under certain conditions, mixer 42 may be eliminated so as to permit means 32 to merely transfer superheated heat depleted vapor from module 14 to input 16 of module 12. Nevertheless, many of the advantages listed above will exist in such a system. As a consequence, the cost of such a system is reduced.

While FIG. 1 shows preheater 36 receiving heat depleted geothermal hot water from vaporizer 34, when two or more such apparatus or systems (i.e., a plurality of systems or apparatus) are used together in a cascaded configuration similar to that disclosed in U.S. Pat. Nos. 4,578,953 and 4,700,543, hot geothermal water advantageously can be supplied in series to the vaporizers of each system as shown in FIG. 3 for producing heat depleted geothermal water. The heat depleted water is then supplied in parallel to the preheaters of each system. When this arrangement is used, it is presently preferable not to employ intermodule desuperheating.

Basically, almost any organic fluid can be used in the present invention. Presently, the preferred organic fluid is n-pentane.

As an example of the effectiveness of the present invention, when liquid is extracted from a preheater to desuperheat heat depleted working fluid exiting module 14, the net electric power produced by generator 20 will be increased by 11% under the condition that 26% additional working fluid flows to module 12, and 15% more heat is input to the power plant. In such case, the heat transfer area of the preheater has to be increased by 100%, and the condenser area has to be increased by 17%. In addition, the overall turbine efficiency will be increased by 5% even when heat depleted working fluid exhausted from module 14 is transferred to inlet 16 of module 12 without any desuperheating.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed:

1. Apparatus for producing power comprising:
   a) a pair of multi-staged turbine modules each of which has an input for receiving vaporized working fluid and an output shaft, and each of which is responsive to vaporized working fluid applied to its input for expending the working fluid and producing work at the output shaft and heat depleted working fluid that is superheated;
   b) an electric generator located between said modules and directly coupled to their output shafts; and
   c) means for supplying superheated, heat depleted working fluid from one of the modules to the input of the other of the modules.

2. Apparatus according to claim 1 including:
   a) a vaporizer for supplying vaporized working fluid to said one of the modules, and a preheater for supplying heated working fluid to said vaporizer;
   b) a mixer interposed between said modules through which superheated, heat depleted working fluid from said one of the modules is transferred to the input of the other of the modules; and
   c) means for supplying liquid working fluid to said mixer for desuperheating the working fluid supplied to the input of the other of the modules.

3. Apparatus according to claim 2 wherein the liquid working fluid supplied to said mixer is heated working fluid produced by said preheater.

4. Apparatus according to claim 3 wherein the liquid working fluid supplied to said mixer is sprayed into the superheated, heat depleted working fluid in the mixer.

5. Apparatus according to claim 4 wherein said working fluid is an organic working fluid.

6. A method for producing power from a pair of multi-staged turbine modules, each of which has an input for receiving vaporized working fluid, and an output shaft, and each of which is responsive to vaporized working fluid applied to its input for expanding the working fluid and producing work at the output shaft and heat depleted working fluid that is superheated, said method comprising the steps of:
   a) positioning an electric generator between the modules such that the generator is directly driven by the output shafts of the modules at the same rotational speed as the modules; and
   b) supplying superheated, heat depleted working fluid from one of the modules to the input of the other of the modules.

7. A method according to claim 6 including vaporizing the working fluid and supplying it to said one of the modules, mixing superheated, heat depleted working fluid from said one of the modules with liquid working fluid for desuperheating the vaporized working fluid before it is supplied to the input of said other of the modules.

8. A method according to claim 7 wherein the liquid fluid mixed with the superheated, heat depleted working fluid is preheated liquid working fluid.

9. Method according to claim 8 wherein mixing of the liquid working fluid with the superheated, heat depleted working fluid is achieved by spraying the liquid working fluid into the superheated, heat depleted working fluid.

10. Method according to claim 9 wherein said working fluid is an organic fluid.

11. A Rankine cycle power plant comprising:
    a) a preheater for preheating liquid working fluid;
    b) a vaporizer for vaporizing preheated liquid working fluid produced by said preheater;
    c) a first turbine module having an input for receiving vaporized working fluid produced by said vaporizer and having an output shaft, said first module being responsive to vaporized working fluid for expanding the working fluid to produce work at the output shaft and heat depleted working fluid that is superheated;
    d) a second turbine module having an input for receiving heat depleted working fluid from the first module and having an output shaft, said second module being responsive to vaporized working fluid for expanding the working fluid to produce work at the output shaft and heat depleted working fluid that is superheated;
    e) an electric generator located between said modules and coupled to their output shafts;
    f) means for supplying superheated, heat depleted working fluid from the first module to the input of the second module; and
    g) a condenser for condensing heat depleted working fluid produced by said second module, and means for supplying condensate produced by the condenser to the preheater.

12. A power plant according to claim 11 including a mixer interposed between said first and second modules through which superheated, heat depleted working fluid from said first module is transferred to the input of the second module, and means for supplying liquid working fluid to said mixer for desuperheating the working fluid supplied to the input of said second module.

13. A power plant according to claim 12 wherein the liquid working fluid supplied to said mixer is working fluid produced by said preheater.

14. A power plant according to claim 12 wherein the liquid working fluid supplied to said mixer is sprayed into the superheated, heat depleted working fluid in the mixer.

15. Apparatus according to claim 1 wherein said working fluid is an organic fluid.

16. Apparatus according to claim 1 wherein said working fluid is pentane.

17. A method according to claim 6 wherein said working fluid is an organic fluid.

18. A method according to claim 6 wherein said working fluid is pentane.

19. Apparatus for producing power comprising:
    a) a plurality of systems each having:

(1) a pair of multi-stage turbines, each of which has an input for receiving vaporized working fluid and an output shaft, and each of which is responsive to vaporized working fluid applied to its input for expanding the working fluid and producing work at the output shaft, and heat depleted working fluid that is superheated;

(2) an electric generator located between said modules and directly coupled to their respective output shafts;

(3) means for supplying superheated, heat depleted working fluid from one of the modules to the input of the other of the module;

(4) a vaporizer for supplying vaporized working fluid to said one of the modules; and (5) a preheater for supplying heated working fluid to said vaporizer;

b) means for serially supplying medium or low temperature fluid from a low grade heat source to the vaporizers to produce heat depleted source fluid; and c) means for supplying heat depleted source fluid to the preheaters in parallel.

20. Apparatus according to claim 19 wherein said working fluid is an organic fluid.

21. Apparatus according to claim 19 wherein said working fluid is pentane.

22. A method for producing power using a plurality of systems each having:

(1) a pair of multi-stage turbines, each of which has an input for receiving vaporized working fluid and an output shaft, and each of which is responsive to vaporized working fluid applied to its input for expanding the working fluid and producing work at the output shaft, and heat depleted working fluid that is superheated;

(2) an electric generator located between said modules and directly coupled to their respective output shafts;

(3) means for supplying superheated, heat depleted working fluid from one of the modules to the input of the other of the module;

(4) a vaporizer for supplying vaporized working fluid to said one of the modules; and (5) a preheater for supplying heated working fluid to said vaporizer;

said method comprising the steps of:

a) serially supplying medium or low temperature fluid from a low grade heat source to the vaporizers to produce heat depleted source fluid; and b) supplying said depleted source fluid to the preheaters in parallel.

23. A method according to claim 22 wherein said step of serially supplying medium or low temperature fluid is carried out using hot geothermal water.

24. A method according to claim 22 wherein the working fluid is an organic fluid.

25. A method according to claim 22 wherein the working fluid is pentane.

26. Apparatus for producing power from a plurality of systems, comprising:

a) a pair of multi-stage turbines, each of which has an input for receiving vaporized working fluid and an output shaft, and each of which is responsive to vaporized working fluid applied to its input for expanding the working fluid and producing work at the output shaft, and heat depleted working fluid that is superheated;

b) an electric generator located between said modules and directly coupled to their respective output shafts;

c) means for supplying superheated, heat depleted working fluid from one of the modules to the input of the other of the module;

d) a vaporizer for supplying vaporized working fluid to said one of the modules; and (5) a preheater for supplying heated working fluid to said vaporizer.

27. Apparatus according to claim 26 including means for supplying medium or low temperature source fluid from a low grade heat source to the vaporizers of said systems in series to produce heat depleted source fluid, and means for supplying heat depleted source fluid to the preheaters of the systems in parallel.

28. An apparatus according to claim 26 wherein the working fluid is an organic fluid.

29. An apparatus according to claim 26 wherein the working fluid is pentane.

30. A method for producing power using a plurality of systems each having:

(1) a pair of multi-stage turbines, each of which has an input for receiving vaporized working fluid and an output shaft, and each of which is responsive to vaporized working fluid applied to its input for expanding the working fluid and producing work at the output shaft, and heat depleted working fluid that is superheated;

(2) an electric generator located between said modules and directly coupled to their respective output shafts;

(3) a vaporizer for supplying vaporized working fluid to said one of the modules; and (4) a preheater for supplying heated working fluid to said vaporizer;

said method comprising the steps of:

a) supplying superheated, heat depleted working fluid from one of the modules to the input of the other of the module.

31. A method according to claim 30 including the step of supplying medium or low temperature source fluid from a low grade heat source to the vaporizers of said systems in series to produce heat depleted source fluid, and means for supplying heat depleted source fluid to the preheaters of the systems in parallel.

32. A method according to claim 30 wherein said step of serially supplying medium or low temperature fluid is carried out using hot geothermal water.

33. A method according to claim 30 wherein the working fluid is an organic fluid.

34. A method according to claim 30 wherein the working fluid is pentane.

35. An organic Rankine cycle power plant comprising:

a) a preheater for preheating organic liquid working fluid;

b) a vaporizer for vaporizing preheated liquid working fluid produced by said preheater;

c) a first turbine module having an input for receiving vaporized organic working fluid produced by said vaporizer and having an output shaft, said first module being responsive to vaporized organic working fluid from said preheater for expanding the organic working fluid to produce work at the output shaft and heat depleted organic working fluid that is superheated;

d) a second turbine module having an input for receiving heat depleted organic working fluid from the first module and having an output shaft, said second module being responsive to vaporized organic working fluid from said first module for expanding the organic working fluid to produce work at the output shaft and heat depleted organic working fluid that is superheated, the turbine efficiency of the second turbine module being higher than the turbine efficiency of the first module;

e) an electric generator located between said modules and coupled to their output shafts; and f) a condenser for condensing heat depleted organic working fluid produced by said second module into condensate; and g) means for supplying said condensate to the preheater.

36. An organic Rankine cycle power plant according to claim 35 wherein said second turbine module comprises at least one turbine stage whose last stage is effective to substantially isolate upstream stages of said second turbine module from changes in back pressure on the second module.

37. An organic Rankine cycle power plant according to claim 36 wherein the Mach number of the last stage in the second turbine module is around 1.2 for substantially isolating the upstream stages of said second turbine module from changes in back pressure.

38. Apparatus according to claim 35 wherein said organic working fluid is pentane.

39. Apparatus for producing power comprising:
(a) a plurality of systems each of which has:
(1) a preheater for preheating organic liquid working fluid;
(2) a vaporizer for vaporizing preheated organic liquid working fluid produced by said preheater;
(3) a pair of multi-staged turbine modules each of which has an input for receiving vaporized organic working fluid and an output shaft, each module being responsive to vaporized organic working fluid applied to its input for expanding the working fluid and producing work at its output shaft and heat depleted working fluid that is superheated;
(4) an electric generator located between said modules and coupled to the their output shafts;
(5) means for supplying superheated, heat depleted organic working fluid produced by one of the pair of modules to the input of the other of the pair of modules;
(6) the turbine efficiency of said other of the pair of modules being higher than the turbine efficiency of said one of the pair of modules;

(b) means for supplying medium or low temperature fluid from a low grade heat source to all of the vaporizers of said systems in series to produce heat depleted source fluid; and (c) means for supplying heat depleted source fluid to all of the preheaters of the systems in parallel.

40. An organic Rankine cycle power plant according to claim 39 wherein the other of the modules of each pair comprises at least one turbine stage whose last stage is effective to substantially isolate upstream stages from changes in back pressure.

41. An organic Rankine cycle power plant according to claim 40 wherein the Mach number of the last stage in the second turbine module is around 1.2 for substantially isolating the upstream stages from changes in back pressure.

42. Apparatus according to claim 39 wherein said organic working fluid is pentane.

43. Apparatus for producing power according to claim 39 wherein said medium or low temperature fluid from said low grade heat source is geothermal fluid.

44. Apparatus for producing power according to claim 43 wherein said geothermal fluid is geothermal water.

45. Apparatus for producing power according to claim 19 wherein said medium or low temperature fluid from said low grade heat source is geothermal fluid.

46. Apparatus for producing power according to claim 45 wherein said geothermal fluid is geothermal water.

47. A method for producing power comprising the steps of:
a) supplying medium or low temperature fluid from a low grade heat source to a plurality of systems each of which has:
(1) a preheater for preheating organic liquid working fluid;
(2) a vaporizer for vaporizing preheated organic liquid working fluid produced by said preheater;
(3) a pair of multi-staged turbine modules each of which has an input for receiving vaporized organic working fluid and an output shaft, each module being responsive to vaporized organic working fluid applied to its input for expanding the working fluid and producing work at its output shaft and heat depleted working fluid that is superheated;
(4) an electric generator located between said modules and coupled to the their output shafts;
(5) means for supplying superheated, heat depleted organic working fluid produced by one of the pair of modules to the input of the other of the pair of modules;

(b) supplying medium or low temperature fluid from a low grade heat source to all of the vaporizers of said systems in series to produce heat depleted source fluid; and (c) supplying heat depleted source fluid to all of the preheaters of the systems in parallel.

48. A method according to claim 47 wherein the step of supplying medium or low temperature fluid from said low grade heat source to the plurality of systems is carried out by supplying geothermal fluid to the plurality of systems.

49. A method according to claim 48 wherein the step of supplying geothermal fluid to the plurality of systems is carried out by supplying geothermal water to the systems.

50. A method according to claim 22 wherein the step of serially supplying medium or low temperature fluid from said low grade heat source to the vaporizers is carried out by supplying geothermal fluid to the vaporizers.

51. A method according to claim 6 wherein the step of positioning an electric generator between the modules permits the generator to be directly driven by the output shafts of the modules at the same rotational speed as the modules such that the modules rotate at a relatively low speed.

52. A method according to claim 51 wherein the relatively low speed is 1800 RPM.

53. A method according to claim 47 wherein the step of positioning an electric generator between the modules permits the generator to be directly driven by the output shafts of the modules at the same rotational speed as the modules such that the modules rotate at a relatively low speed.

54. A method according to claim 53 wherein the relatively low speed is 1800 RPM.

55. Apparatus according to claim 1 wherein the electric generator positioned between the modules permits the generator to be directly driven by the output shafts of the modules at the same rotational speed as the modules at a relatively low speed.

56. Apparatus according to claim 55 wherein the relatively low speed is 1800 RPM.

57. A power plant according to claim 11 wherein the electric generator positioned between the modules is directly coupled to the output shafts of the modules.

58. A power plant according to claim 57 wherein the electric generator positioned between the modules permits the generator to be directly driven by the output shafts of the modules at the same rotational speed as the modules at a relatively low speed.

59. Apparatus according to claim 58 wherein the relatively low speed is 1800 RPM.

60. Apparatus according to claim 19 wherein the electric generator positioned between the modules permits the generator to be directly driven by the output shafts of the modules at the same rotational speed as the modules at a relatively low speed.

61. Apparatus according to claim 60 wherein the relatively low speed is 1800 RPM.

62. Apparatus according to claim 26 wherein the electric generator positioned between the modules permits the generator to be directly driven by the output shafts of the modules at the same rotational speed as the modules at a relatively low speed.

63. Appartus according to claim 62 wherein the relatively low speed is 1800 RPM.

64. A power plant according to claim 35 wherein the electric generator positioned between the modules permits the generator to be directly driven by the output shafts of the modules at the same rotational speed as the modules at a relatively low speed.

65. A power plant according to claim 64 wherein the relatively low speed is 1800 RPM.

66. A power plant according to claim 11 wherein the electric generator positioned between the modules permits the generator to be directly driven by the output shafts of the modules at the same rotational speed as the modules at a relatively low speed.

67. A power plant according to claim 66 wherein the relatively low speed is 1800 RPM.

68. Apparatus according to claim 43 wherein the electric generator positioned between the modules permits the generator to be directly driven by the output shafts of the modules at the same rotational speed as the modules at a relatively low speed.

69. Apparatus according to claim 68 wherein the relatively low speed is 1800 RPM.

70. Apparatus for producing power according to claim 1 including means for supplying geothermal fluid to the vaporizers of said systems.

71. Apparatus according to claim 70 wherein the electric generator positioned between the modules permits the generator to be directly driven by the output shafts of the modules at the same rotational speed as the modules at a relatively low speed.

72. Apparatus according to claim 71 wherein the relatively low speed is 1800 RPM.

73. A power plant according to claim 11 including means for supplying geothermal fluid to the vaporizers of said systems.

74. A power plant according to claim 73 wherein the electric generator positioned between the modules is directly coupled to the output shafts of the modules.

75. A power plant according to claim 74 wherein the electric generator positioned between the modules permits the generator to be directly driven by the output shafts of the modules at the same rotational speed as the modules at a relatively low speed.

76. Apparatus according to claim 75 wherein the relatively low speed is 1800 RPM.

77. Apparatus for producing power according to claim 26 including means for supplying geothermal fluid to the vaporizers of said systems.

78. Apparatus according to claim 77 wherein the electric generator positioned between the modules permits the generator to be directly driven by the output shafts of the modules at the same rotational speed as the modules at a relatively low speed.

79. Apparatus according to claim 78 wherein the relatively low speed is 1800 RPM.

80. Apparatus for producing power comprising:
a) a pair of multi-staged turbine modules each of which has an input for receiving vaporized working fluid and an output shaft, and each of which is responsive to vaporized working fluid applied to its input for expanding the working fluid producing heat depleted working fluid and driving the output shaft;
b) an electric generator located between said modules and directly coupled to their output shafts for driving the generator at the same speed as the turbine modules; and
c) means for supplying heat depleted working fluid from one of the modules to the input of the other of the modules.

* * * * *